United States Patent [19]

Junghanns

[11] 4,284,343
[45] Aug. 18, 1981

[54] APPARATUS FOR THE ELECTRIC LEVEL CONTROL OF A DEVELOPING SOLUTION IN A STORAGE TANK

[75] Inventor: Martin Junghanns, Kelkheim, Fed. Rep. of Germany

[73] Assignee: Hoechst Aktiengesellschaft, Frankfurt am Main, Fed. Rep. of Germany

[21] Appl. No.: 65,198

[22] Filed: Aug. 9, 1979

[30] Foreign Application Priority Data

Aug. 12, 1978 [DE] Fed. Rep. of Germany ....... 2835413

[51] Int. Cl.³ ............................................. G03D 5/06
[52] U.S. Cl. ................................... 354/318; 354/324; 137/392; 73/304 R
[58] Field of Search ............. 354/297, 318, 324; 137/392; 73/304 R; 116/109, 227

[56] References Cited

U.S. PATENT DOCUMENTS

| 2,230,137 | 1/1941 | Ewertz | 73/304 |
|---|---|---|---|
| 2,233,297 | 2/1941 | Polin et al. | 73/304 R |
| 2,483,967 | 10/1949 | Eberwine | 73/304 |
| 2,787,756 | 4/1957 | Feinte | |
| 2,938,383 | 5/1960 | Blackburn | 73/304 R |
| 3,068,886 | 12/1962 | Hixon et al. | |
| 3,119,266 | 1/1964 | Atkinson | 73/304 |
| 3,339,411 | 9/1967 | Riffie | 73/304 |
| 3,373,351 | 3/1968 | Rak | 73/304 R |
| 3,461,722 | 8/1969 | Martens | 73/304 |
| 3,580,158 | 5/1971 | Scholle | 137/392 |
| 3,598,144 | 8/1971 | Hodgson | 137/392 |
| 3,605,798 | 9/1971 | Green et al. | 137/392 |
| 3,846,818 | 11/1974 | Merz | 354/324 |
| 3,947,692 | 3/1976 | Payne | 73/304 R |
| 4,169,377 | 10/1979 | Scheib | 73/304 R |

OTHER PUBLICATIONS

Elektrotechnische Zeitschrift E.T.Z. pp. 457-459.

Primary Examiner—L. T. Hix
Assistant Examiner—Alan Mathews
Attorney, Agent, or Firm—Schwartz, Jeffery, Schwaab, Mack, Blumenthal & Koch

[57] ABSTRACT

Apparatus for monitoring the level of a developing solution within a storage tank utilizing at least two electrodes having active surfaces exposed to the developing solution for the conduction of electrical current therebetween. The electrodes have their active surfaces positioned at different levels within the developing solution. One electrode serves as a reference and is always immersed in the developing solution. Electrical signals developed when the developing solution falls below the level of the active surface of the electrodes is utilized to trigger an electrical switching circuit which is connected to the electrodes for governing a signalling and/or control action of the developing station.

6 Claims, 5 Drawing Figures

4,284,343

APPARATUS FOR THE ELECTRIC LEVEL CONTROL OF A DEVELOPING SOLUTION IN A STORAGE TANK

BACKGROUND OF THE INVENTION

1. Field of the Invention

This invention relates to an apparatus for the electric level control of a developing solution contained in a storage tank and used for developing two-component diazo-type material according to a semi-dry developing process.

2. Description of the Prior Art

Diazo printers with developing stations operative in accordance with the semi-dry development process are equipped with roll-application means which include means for supplying developing solution to the two-component diazo-type sheet material. The roll-application means comprise mainly an applicator roll, a press roll and a back-up roller which forces the press roll against the applicator roll.

A problem occurs in the use of roll-application means of this type in that the applicator roll which is usually covered with a rubber coating, has a relatively delicate surface, and damage to this surface often prevents uniform development. A dry running of the applicator roll under the compressive load exerted by the press roll and the back-up roller must, consequently, be avoided, because dry running results in a sudden strong increase of the frictional and flexing forces at the applicator roll which may damage or even destroy the surface of the applicator roll. It is, therefore, necessary to always have sufficient developing solution for moistening the applicator roll. A lack of developing solution may be caused by normal consumption, by suddenly occurring leaks or by a breakdown of a feed pump which conveys the developing solution from a larger supply container to the storage tank of the developing device.

The level of the developing solution in the storage tank of the developing device may generally be monitored by controlling means provided with a bubble tube or a float or by optical or electromagnetic control systems. In the present case, however, these known devices do not provide reliable monitoring, since foaming on the surface of the developing solution caused in particular by pumping the solution into the storage tank, interferes with these level control monitoring devices. Further, prior art control means, in particular those functioning according to optical and electromagnetic systems are expensive, especially if different signals are to be generated when the developing solution exceeds or falls below different level heights.

SUMMARY OF THE INVENTION

It is, therefore, an object of the present invention to provide an improved apparatus for the electric level control of a developing solution contained in a storage tank and used for developing two-component diazo-type material according to the semi-dry process. The invention is achieved in such a way that a reliable monitoring is possible in spite of the characteristic of the developing solution, namely its tendency towards foaming. Further, the invention is relatively simple and inexpensive when compared to prior art devices.

In the apparatus described in accordance with the invention use is made of the fact that the developing solution employed for developing two-component diazo-type material according to the semi-dry process has a sufficiently high conductivity, so that the height of the liquid level can be determined by measuring the electric resistance, especially the ohmic resistance, between two electrodes which extend into the storage tank. One of these electrodes serves as a reference electrode. A sudden change of the resistance which can be measured between two electrodes occurs, in particular, when the active surfaces of these electrodes are immersed in the developing solution or when the level of the developing solution falls below the height of at least one of these active surfaces. The characteristic change of the resistance between the electrodes can be evaluated due to the current flow between these electrodes. For that purpose, the electrodes are connected to an electric switching arrangement which triggers a signalling or control action as a function of the resistance between the electrodes.

It is a particular advantage of the apparatus that its functioning is not affected by foaming on the surface of the developing solution. In addition, the apparatus which may comprise merely the electrodes, a current source, an amplifier and, if appropriate, simple switch members, may be economically manufactured.

In an advantageous embodiment of the apparatus in accordance with the invention at least four electrodes are disposed in the storage tank. These electrodes are positioned to have their active surfaces at different heights.

Of these electrodes, the lowermost electrode serves as a reference and is always immersed in the developing solution. The three other electrodes end at different heights above the reference electrode and are capable of triggering control and/or signalling actions as a function of the level height.

A particular embodiment of the apparatus is provided with several annular electrodes positioned in spaced relationship on the insulated circumference of a member to form an integral body thereon.

The installation of the electrodes designed in this way is considerably easier, because only a single body must be mounted in the storage tank. The connecting leads of the annular electrodes which are run out of the storage tank must be mutually insulated.

In a further improvement of the above-described integral body representing several electrodes, a metal core is imbedded in the body, and the exposed lower cross-sectional area of this core serves as a reference electrode. In this case, the metal core imparts a high degree of stiffness to the body and renders it of a particular simple construction because the exposed lower cross section of the metal core functions as a reference electrode.

A particularly appropriate embodiment of the apparatus for the electric level control is provided with a developing solution contained in a storage tank of a developing device comprising roll-application means which can be driven by a driving motor, means for relieving of load and loading a back-up roller and a metering blade, an immersion pump connected with the storage tank for pump-feeding developing liquid to the roll-application means, and optical and/or acoustic control elements. There is further provided an electric switching arrangement connected to the electrodes including a reference electrode, and the switching arrangement has the following features: if the level of the developing solution falls below the lower active surface of a first electrode disposed slightly above the suction level of the immersion pump, the pump and the driving motor are stopped, the back-up roller and the metering blade are relieved of load and the optical and/or acoustic control elements are switched on; if the level of the developing solution falls below the active surface of a second electrode which is arranged above the lower active surface of the first electrode, the optical and/or acoustic control elements and a second pump feeding developing solution from a second supply container into the monitored first storage tank are switched on by means of a switch member; and if the level of the developing solution has reached the active surface of a third electrode which is arranged above the lower surface of the second electrode, the second pump is stopped.

The second pump which feeds developing solution into the storage tank from a second larger supply container is thus working as long as the level of the developing solution is between the lower active surfaces of the second and the third electrode. Those of the electric elements which, depending upon their function, are switched on or off when the liquid level falls below the lower active surface of the first electrode may, on the other hand, be switched off or on when the liquid level is higher than the lower active surface of the first electrode. This applies also to the reversible switching operations which are triggered when the liquid level exceeds or falls below the lower active surface of the second electrode.

Particularly advantageous, however, the lowermost electrode controls a self-holding switching (latching) arrangement which is constructed in such a way that only if a pushbutton of the self-holding switching arrangement is manually actuated, then in case of the liquid level falling below the lower active surface of the lowermost electrode, the immersion pump and the driving motor are started, the back-up roller and the metering blade are loaded and the optical and/or acoustic control elements are switched off.

In addition, the apparatus may appropriately have the feature that the second electrode is adapted to trigger a pulse generator for the pulsed operation of the optical and/or acoustic control elements.

This indicates to the operator that the liquid level is no longer at the very critical height below the lower active surface of the first electrode, but that it has reached the less critical region between the lower active surfaces of the first and the second electrode.

The apparatus comprising a second supply container from which fresh developing solution is fed into several developing devices may additionally have the feature that the second and the third electrode control magnetic valves which serve to supply developing solution to that developing device in which the liquid level has fallen below the height indicated by the second electrode. The liquid levels in the storage tanks of several developing devices can, thus, be monitored and regulated in an inexpensive manner with the aid of a valve each assigned to each developing device, with a common larger supply container and a common pump for pump-feeding developing solution from the larger container into that of the smaller storage tanks in which the level of the developing solution has dropped below a critical height.

BRIEF DESCRIPTION OF THE DRAWINGS

The invention is explained hereinafter by reference to the figures, wherein identical parts are marked with the same reference numerals, and wherein.

DETAILED DESCRIPTION OF THE PREFERRED EMBODIMENT

Figure 1:
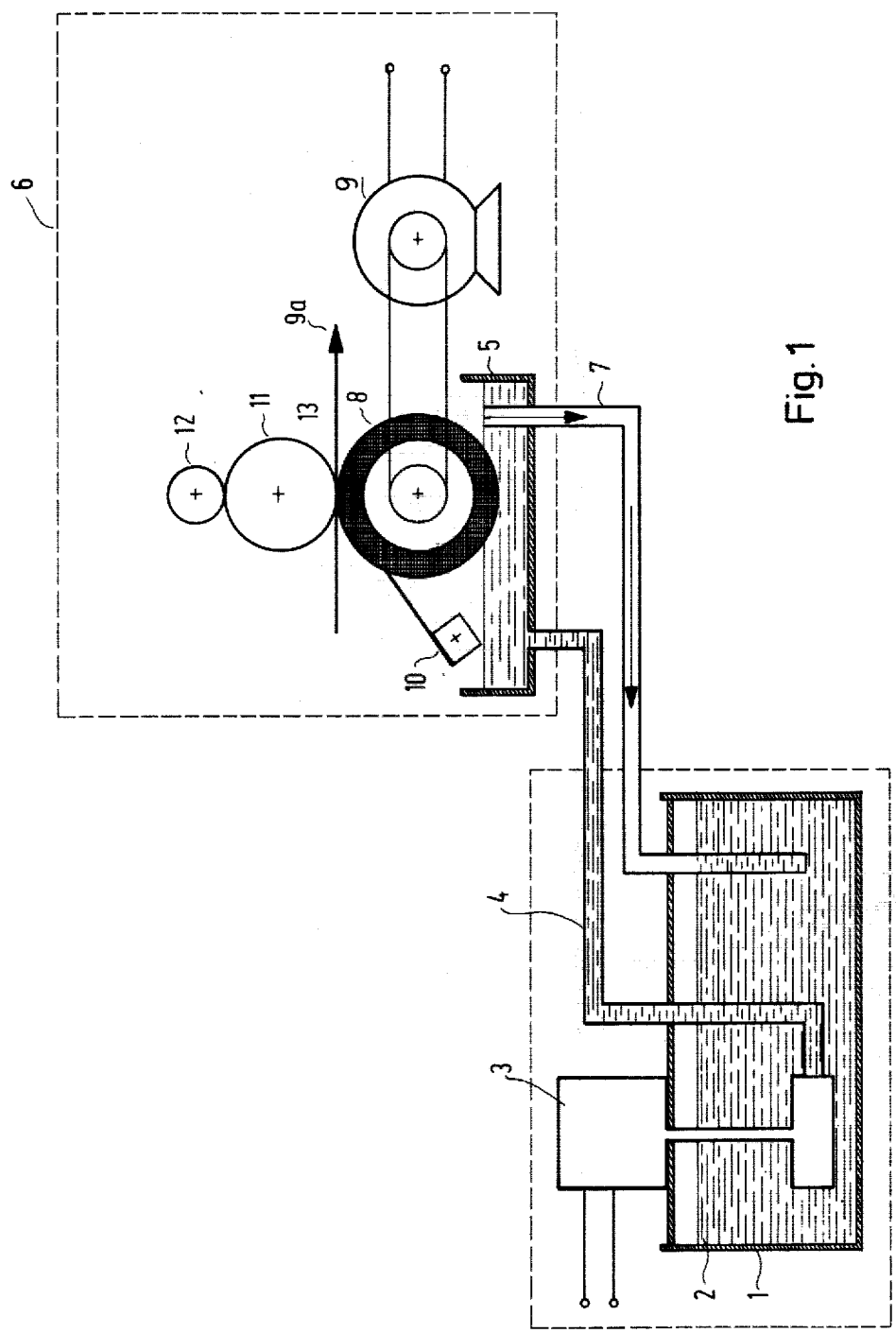
FIG. 1 represents a diagrammatic arrangement of the developing device comprising roll application means and a storage tank.

Reference numeral 1 in FIG. 1 denotes a storage tank for the developing solution 2, wherein the level of the developing solution is to be monitored and regulated. An immersion pump 3 driven by an electric motor is immersed in the developing solution contained in the storage tank. Via a feed line 4 the pump is linked with a trough 5 into which the developing solution is fed and which forms part of a roll-application means 6. In FIG. 1, the roll-application means 6 is enclosed by broken lines. An overflow pipe 7 leads from the trough 5 back into the storage tank 1.

The roll-application means 6 includes a rubber-coated applicator roll 8 which is partly immersed in the developing solution in the trough 5 and is driven by a motor 9. A metering blade 10 is in contact with the applicator roll and serves to wipe off any excess developing solution from the applicator roll. There is further a back-up roller 12 which forces a press roll 11 against the applicator roll. Thus, a developing zone 13 is formed between the applicator roll and the press roll, and through this developing zone the diazo-type sheet material to be developed is transported in the direction of travel 9a.

Figure 2:
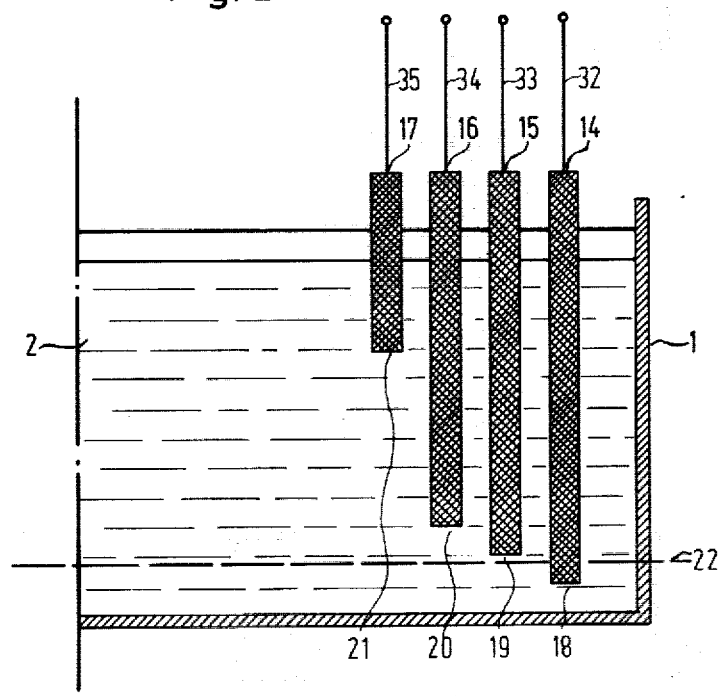
FIG. 2 shows an arrangement of electrodes in the storage tank.

FIG. 2 is a sectional view of the storage tank 1 wherein electrodes 14, 15, 16 and 17 are arranged horizontally spaced with respect to one another. These electrodes monitor the level of the developing solution 2. The heights of the lower active surfaces 18, 19, 20 and 21 of the electrodes are arranged as follows:

The lower active surface 18 of the electrode 14 which acts as reference electrode, is below the suction level of the immersion pump 3, marked by a broken line 22. The lower active surface 20 of the electrode 16, in turn, is slightly above the lower active surface 19 of the electrode 15. The lower active surface 21 of the electrode 17 is at a greater distance from the lower active surface 20 of the electrode 16. The term "lower active surface" signifies that these surfaces are conductive and are thus capable of triggering a switching operation, if the developing solution in the storage tank falls below or exceeds the height of the respective surface. Consequently, each lower active surface determines a switching operation. The lower active surface 18 of the reference electrode 14 is arranged at such a height that it is always immersed in the developing solution, i.e. the reference electrode 14 itself does not trigger any switching operation, but merely serves to introduce a potential into the developing solution, so that by the reference electrode, in connection with the other electrodes, a flow of current may be generated. The switching level defined by the lower active surface 19 indicates that the height of the liquid in the storage tank has dropped to such an extent that any further drop would cause the immersion pump to suck in air and that there is an acute risk of the applicator roll running dry. The switching level defined by the lower active surface 20 indicates that the liquid level in the storage tank is already so low that countermeasures must be taken to stop any further drop of the level and to keep the applicator roll from running dry.

The switching level determined by the lower active surface 21 indicates that the level of the developing solution is so high that no further developing solution should be pumped into the storage tank, in order to prevent an undesired escape of solution from the tank, even if developing solution is returned into the storage tank from the trough 5 through the overflow pipe 7, e.g. when the developing device is stopped.

The lower active surfaces 18 to 21 of the electrodes 14 to 17 in FIG. 2, which are not insulated are, at the same time, the spatial lower outlets of these electrodes. It is conceivable that, in other embodiments of the apparatus, all electrodes extend equally far into the storage tank and that the positions of their lower active surfaces are determined by covering the lower ends of the electrodes with an electrically insulating material up to the beginning of the active surfaces.

Figure 3:
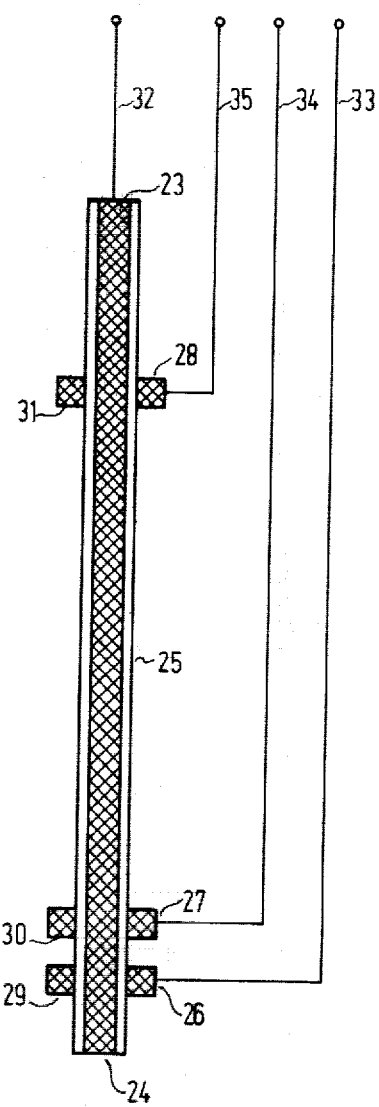
FIG. 3 shows several electrodes which are combined to form a common integral body.

FIG. 3 shows an alternative electrode design in which all electrodes are combined to form a joint electrode arrangement.

In detail, this joint electrode arrangement has a metal core 23, the lower cross-sectional area of which is not insulated so that it constitutes the lower active surface 24 of a reference electrode. This lower active surface 24 corresponds to the lower active surface 18 of the reference electrode 14 in FIG. 2. The metal core 23 in FIG. 3 is covered over its circumference with an electrically insulating material 25. On the material 25 covering the circumference three annular electrodes 26, 27 and 28 are mounted at different heights with respect to the lower active surface 24. The concentrical arrangement of the electrodes is shown in FIG. 3. The annular electrodes are composed of metal, and their entire surfaces are uninsulated, so that their respective lower active surfaces 29, 30 and 31 define the switching levels of the electrodes. Each electrode is equipped with a connecting lead 32, 33, 34 and 35.

Figure 4:
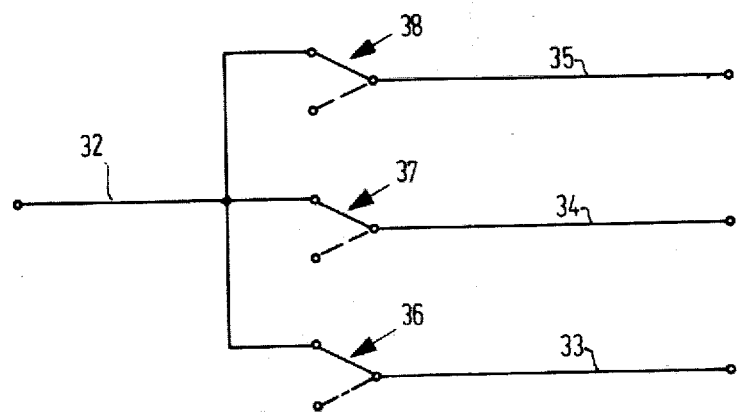
FIG. 4 depicts an equivalent circuit diagram of the electrode arrangements according to FIGS. 2 and 3.

FIG. 4 depicts an equivalent diagram of the switching electric circuit diagram of the electrode arrangements according to FIGS. 2 and 3. Each electrode 15, 16 and 17 or 26, 27 and 28, together with the appertaining reference electrode 14 or 24 constitutes a switching element 36, 37 and 38 which is closed as soon as the liquid level in the storage tank exceeds the lower active surface of the respective electrode.

Figure 5:
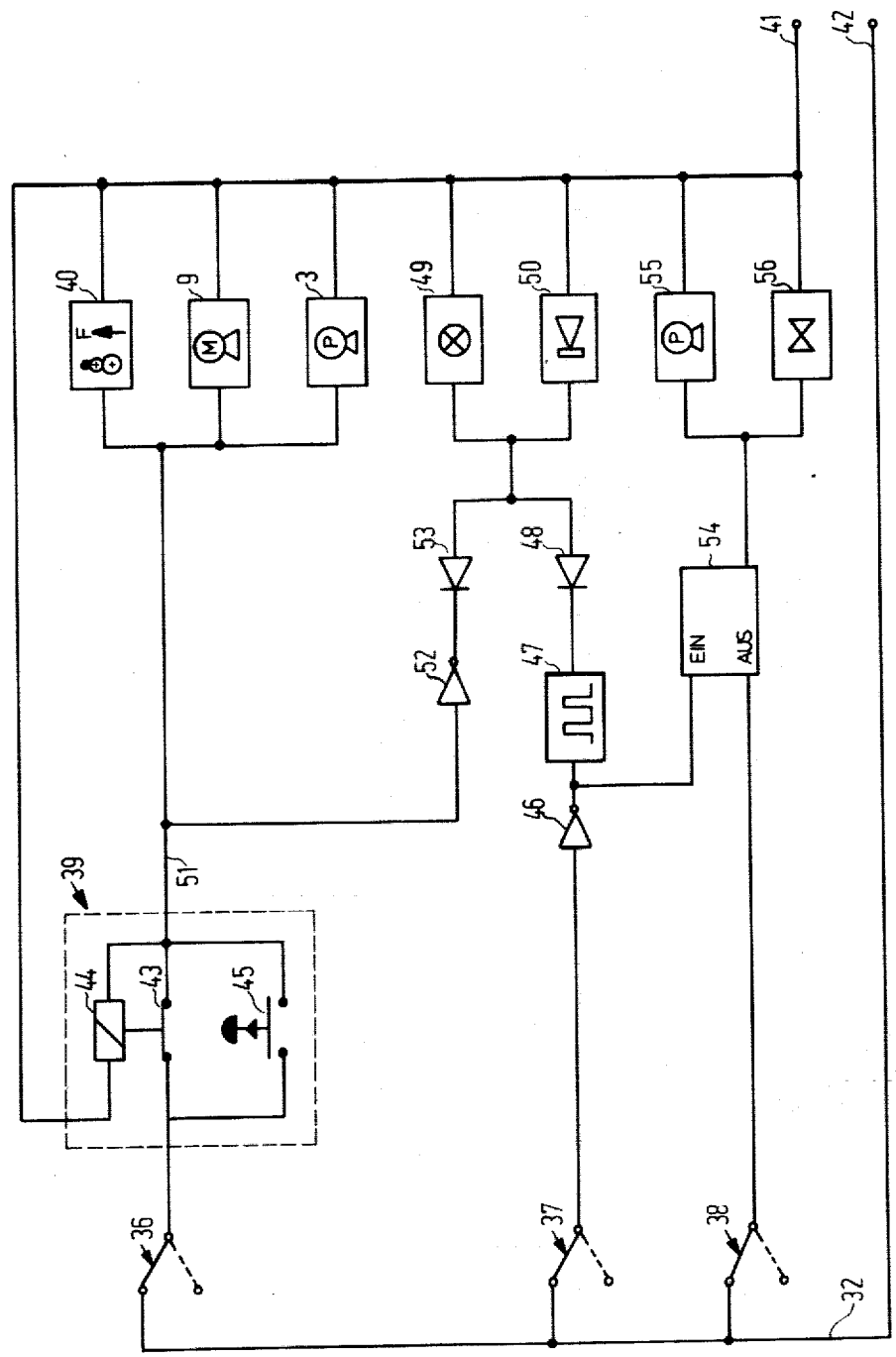
FIG. 5 represents an electric switching arrangement in connection with the electrodes in the storage tank.

FIG. 5 shows how the switching elements formed by the electrodes are connected to an electric switching arrangement, by means of which the supply of developing solution to the storage tank is controlled, the critical parts of the apparatus are stopped and optical and/or acoustic control elements are actuated.

In FIG. 5, all contacts are shown in the on-position, i.e. in the position adopted when the developing solution 2 has reached the highest level in the storage tank 1.

The immersion pump 3, the driving motor 9 and a device 40 for relieving the load on the roll-application means are connected to the switching element 36 by way of a self-holding switching arrangement 39 which is enclosed by broken lines in FIG. 5. When the switching element 36 is in the on-position a circuit is closed between the terminals 41 and 42. The self-holding switching arrangement 39 comprises a make contact 43 which can be actuated by a relay 44. The relay is connected in parallel with the immersion pump, the driving motor and the device for relieving the roll-application means of load. A contact 45 which can be manually actuated by a pushbutton is arranged parallel to the make contact 43.

From the switching element 37 a lead is run, via an inverter 46, a pulse generator 47 and a protective diode 48, to an optical control element 49 and an acoustic control element 50. An additional connection is provided between these control elements and the output 51 of the self-holding switching arrangement, via a second inverter 52 and a second protective diode 53.

The third switching element 38 is connected to an "off" input of a switch member 54. In addition, an "on" input of that switch member is linked with the output of the inverter 46, which is connected to the switching element 37.

Leads are run from the output of the switch member 54 to a second pump 55 which is adapted to pump developing solution into the storage tank 1 from a larger supply container which is not shown. Further, a valve 56 is connected to the output of the switch member 54, the valve being inserted into the delivery pipe of the pump 55. Additional valves, which are not shown, may also be inserted into the delivery pipe of the pump 55, and these valves are actuated by switching arrangements which correspond to or are similar to those shown in FIG. 5 and are assigned to additional developing devices.

The switching arrangement according to FIG. 5 functions as follows:

If the level of the developing solution in the storage tank 1 falls below a particular height, resulting in the opening of the switching element 36, i.e. the level is below the lower active surface 19 in FIG. 2 or 29 in FIG. 3, the driving motor 9 and the immersion pump 3 are stopped, since there is a risk of the roll-application means running dry. Further, the applicator roll is relieved of the compressive load exerted by the press roll and the back-up roller, by means of the device 40. At the same time, the static load of the metering blade is removed from the applicator roll. The switching arrangement is then self-holding, because the relay 44 is de-energized and the make contact 43 is, therefore, open. The currentless condition of the output 51 of the self-holding switching arrangement 39 is utilized to activate the optical control element 49 and the acoustic control element 50, via the second inverter 52 and the second protective diode 53. The self-holding condition can only be cancelled by a manual operation via the pushbutton which actuates the contact 45. This measure enables a checking of the apparatus for faults which resulted in the drop of the developing solution in the storage tank 1 to a level close to the suction level 22.

If the level of the developing solution in the storage tank 1 falls only below the height of the lower active surface 20 in FIG. 2 or 30 in FIG. 3, the switching element 37 opens; the pulse generator 47 is then actuated by the inverter 46 and causes a pulsed operation of the optical control element 49 and the acoustic control element 50, via the protective diode 48. This shows that the developing solution in the storage tank 1 has fallen below a particular level which is, however, not as critical as falling below the level at which the switching element 36 is opened. The last-mentioned condition is indicated by an uninterrupted optical and acoustic signal. Consequently, if the level is only below the lower active surface 20 or 30, respectively, the second pump 55 is put in operation via the "on" input of the switch member 54 and the valve 56 is opened, so that fresh developing solution is pumped into the storage tank 1 from a larger supply container.

This pumping in of fresh developing solution into the storage tank 1 is terminated as soon as the level of the developing solution 2 in the storage tank 1 has reached the active surface 21 in FIG. 2 or 31 in FIG. 3; the switching element 38 is then closed, so that the "off" input of the switch member 54 becomes active which stops the pump 55 and closes the valve 56.

It is further mentioned that, in the electric switching arrangement according to FIG. 5, additional amplifying elements may be interposed between the electrodes or the switching elements 36, 37 and 38 which are equivalent representations of the electrodes and the rest of the switching arrangement, so that sufficient energy is available for the described operations.

In the above-described manner, the entire apparatus is automatically controlled by an inexpensive and, in particular in the case of foaming, reliably working electrode arrangement. The electrode arrangement is especially suitable for use with a developing solution on a basis of water, containing one or several alkaline constituents and a wetting agent.

What is claimed is:

1. An apparatus for monitoring the level of a developing solution contained in a storage tank and used for developing in a development device comprising:
   electrodes positioned inside said storage tank,
   said electrodes having active surfaces positioned at different levels in said tank and exposed to the developing solution for the conduction of electrical current,
   at least one of said electrodes having its active surface positioned at a level height of the developing solution at which a signalling action is started, and another one of said electrodes having an active surface substantially always positioned, when operative, within said developing solution thus serving as a reference electrode,
   an elongated body member having an insulating circumferential material thereon, at least said non-reference electrodes being annular and spacedly disposed around said elongated body member, and
   an electric switching circuit connected to said electrodes for triggering the signalling action as a function of the electric resistance between the electrodes.

2. An apparatus as recited in claim 1 wherein said developing device comprises:
   (a) a roller application means,
   (b) drive means for driving said roller application means,
   (c) a back-up roller,
   (d) means for providing and releasing load on said back-up roller,
   (e) a first pump for pumping said developing solution for contact with said roller application means,
   (f) an optical indicator, and
   (g) a second pump for pumping developing solution into said storage tank, and
   wherein said apparatus further comprises:
   (h) said reference electrode and first, second and third additional electrodes, said first electrode having an active surface positioned above said reference electrode active surface, said second electrode having an active surface positioned above said first electrode active surface, and said third electrode having an active surface positioned above said second electrode active surface, and
   (i) an electronic switching arrangement including:
      (1) means, responsive to a first electrical signal resulting from the developing solution falling below the active surface of said first electrode for stopping said first pump and said drive means, relieving load on said back-up roller and switching on said optical indicators,
      (2) means, responsive to a second electrical signal resulting from the developing solution falling below the active surface of said second electrode for switching on said optical indicators and said second pump, and
      (3) means, responsive to a third electrical signal resulting from the developing solution reaching the active surface of said third electrode for turning off said second pump.

3. An apparatus as recited in claim 2 wherein said means responsive to said second electrical signal comprises a pulse generator.

4. An apparatus as recited in claim 2 wherein said developing device further comprises valve means operative in cooperation with said second pump for pumping developing solution into said storage tank.

5. An apparatus as recited in claim 2 wherein said means responsive to said first electrical signal comprises a latching circuit having a relay and a manual switch, said manual switch operative for energizing said relay for turning on said first pump, loading said back-up roller and switching off said optical indicators.

6. An apparatus as recited in claim 1 wherein a metal core is embedded in said elongated body member, the lower cross-sectional area of which is not insulated so that it constitutes an active surface of a reference electrode, said metal core being exposed at the lower end thereof to said developing solution, said metal core thereby forming said reference electrode and wherein the other electrodes are annular and spacedly disposed at different heights with respect to said active surface around the insulated circumference of said elongated body member.

* * * * *